(12) United States Patent
Kojo et al.

(10) Patent No.: US 6,244,373 B1
(45) Date of Patent: Jun. 12, 2001

(54) STEERING CONTROL APPARATUS FOR VEHICLE

(75) Inventors: Takahiro Kojo; Junji Kawamuro, both of Susono; Masahiko Shindo, Sunto-gun; Morihiro Matsuda, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/244,108

(22) Filed: Feb. 4, 1999

(30) Foreign Application Priority Data

Apr. 27, 1998 (JP) .................................................. 10-117463

(51) Int. Cl.$^7$ ...................................................... B62D 5/04
(52) U.S. Cl. .......................... 180/443; 180/446; 701/41; 701/42
(58) Field of Search .................. 180/443, 446; 701/41, 42

(56) References Cited

U.S. PATENT DOCUMENTS

| | | | |
|---|---|---|---|
| 5,881,836 | * 3/1999 | Nishimoto et al. | 180/446 |
| 5,884,724 | * 3/1999 | Bohner et al. | 180/443 |
| 5,893,429 | * 4/1999 | Hackle et al. | 180/443 |
| 5,894,205 | * 4/1999 | Shimizu et al. | 180/446 X |
| 5,925,082 | * 7/1999 | Shimizu et al. | 701/41 |
| 5,984,042 | * 11/1999 | Nishimoto et al. | 180/446 |
| 5,988,310 | * 11/1999 | Nishino et al. | 180/443 |
| 5,992,556 | * 11/1999 | Miller | 180/446 |
| 5,992,557 | * 11/1999 | Nakamura et al. | 180/446 |
| 5,992,558 | * 11/1999 | Noro et al. | 180/446 |
| 6,008,599 | * 12/1999 | Beck | 180/446 X |
| 6,032,755 | * 3/2000 | Blandino et al. | 180/446 |
| 6,041,887 | * 3/2000 | Kojo et al. | 180/446 |
| 6,052,633 | * 4/2000 | Fukuyama et al. | 701/41 |
| 6,091,214 | * 7/2000 | Yamawaki et al. | 180/443 X |
| 6,092,619 | * 7/2000 | Nishikawa et al. | 180/446 |

FOREIGN PATENT DOCUMENTS

| | | | |
|---|---|---|---|
| 62-46769 | 2/1987 | (JP) . | |
| 63-227472 | 9/1988 | (JP) . | |
| 2-127169 | * 5/1990 | (JP) | 180/443 |
| 4-159178 | * 6/1992 | (JP) | 180/443 |

* cited by examiner

Primary Examiner—Lanna Mai
Assistant Examiner—Toan To
(74) Attorney, Agent, or Firm—Oliff & Berridge, PLC

(57) ABSTRACT

Target rotational speed of servo motor 31 is set based on steering speed $\theta hv$ detected by steering speed sensor and transmission ratio G set according to a running condition, and speed of servo motor is controlled so that rotational speed $\theta pv$ of servo motor detected by rotational speed sensor may agree with the target rotational speed.

10 Claims, 7 Drawing Sheets

T-N CHARACTERISTICS OF SERVO MOTOR

STEERING CONTROL APPARATUS FOR VEHICLE

BACKGROUND OF THE INVENTION

1. Field of the Invention

The present invention relates to a steering control apparatus for vehicle provided with a transmission ratio varying mechanism for varying a transmission ratio between a steering amount of a steering wheel and a turn amount of wheels.

2. Related Background Art

An example of the steering control apparatus provided with the transmission ratio varying mechanism of this type is disclosed in Japanese Laid-open Patent Application No. Sho 63-227472, for example. As disclosed in this application, the transmission ratio varying mechanism is provided with a driving motor and is constructed in such structure that a prescribed gear mechanism connects an input shaft connected to the steering wheel side to an output shaft connected to the tie rod side and that the transmission ratio of rotations between the input shaft and the output shaft can be changed by driving the gear mechanism by the driving motor.

On this occasion, the driving motor is controlled so that a rotational position of the driving motor detected by a rotational angle sensor approaches a target position computed based on the steering angle of the steering wheel and the transmission ratio.

SUMMARY OF THE INVENTION

Since the position control of the driving motor was carried out based on deviation from the target position as described above, the driving motor might be driven by the degree corresponding to remaining deviation even in the cases where steering operation was stopped after abrupt steering operation and where abrupt switching-back operation of the steering wheel was carried out. An example thereof is illustrated in FIG. 8. When the abrupt switching-back operation of the steering wheel is carried out, the target rotational position of the driving motor varies as indicated by a solid line. In contrast with it, at a point of time t1 when the steering wheel is switched back, the deviation e1 due to a delay in follow-up remains with respect to an actual rotational position of the driving motor indicated by a dashed line. As the steering direction of the steering wheel is switched back after this point, steering torque is also switched so that the direction of the steering torque becomes opposite to the rotating direction of the driving motor. Therefore, the steering torque comes to act in the direction to assist the rotation of the driving motor. This steeply increases the rotating speed of the driving motor. At time t2 the rotational position of the driving motor agrees with the target rotational position. Although the control of the driving motor is desired to stop there, a large overshoot e2 appears at time t3 because of the inertia of the driving motor and the rotational speed of the driving motor increased. This phenomenon resulted in giving a driver such incompatible steering feeling that the steering direction of the steering wheel is not coincident with the steered direction of the wheels.

The present invention has been accomplished in order to solve this problem and an object thereof is to provide a steering control apparatus for vehicle that can improve the steering feeling by adequately suppressing occurrence of the above-stated overshoot due to the inertia of motor.

The present steering control apparatus for vehicle is a steering control apparatus for vehicle adapted to change a transmission ratio between a steering amount and a turn amount by driving a transmission ratio varying mechanism by an actuator, the steering control apparatus for vehicle comprising: transmission ratio setting means for setting the transmission ratio according to a running condition of a vehicle; steering speed detecting means for detecting a steering speed of a steering wheel; driving speed setting means for setting a target driving speed for the actuator, based on the transmission ratio set by the transmission ratio setting means and the steering speed detected by the steering speed detecting means; and speed control means for controlling a speed of the actuator to the target driving speed set by the driving speed setting means.

The speed control means carries out the speed control of the actuator according to increase or decrease of the steering speed during manipulation of the steering wheel. For example, in the preceding example of FIG. 8, this control decreases the driving speed of the actuator with decreasing steering speed toward the time to and then nulls the driving speed of the actuator at the point of the time t1 at which the steering speed is zero. This adequately suppresses occurrence of the overshoot due to the inertia of motor.

The steering control apparatus may further comprise limiting means for limiting the target driving speed to the magnitude within a predetermined range.

When the target driving speed of the actuator is limited by the limiting means, for example when the limit is defined by the operation limit speed of the actuator, the speed of the actuator is always controlled within the range not more than the operation limit speed, which can prevent occurrence of the overshoot with reliability.

The steering control apparatus for vehicle may further comprise: driving speed detecting means for detecting the driving speed of the actuator; and failure determining means for determining whether a failure occurs, based on the driving speed detected by the driving speed detecting means and the target driving speed limited by the limiting means.

Since the target driving speed is limited to the magnitude in the predetermined range by the limiting means, the deviation between the target driving speed and the driving speed detected becomes smaller than predetermined deviation. Therefore, the failure determining means determines that a failure occurred in a control system, for example, when this deviation is greater than a predetermined value.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Embodiments of the present invention will be described with reference to the accompanying drawings.

Figure 1:
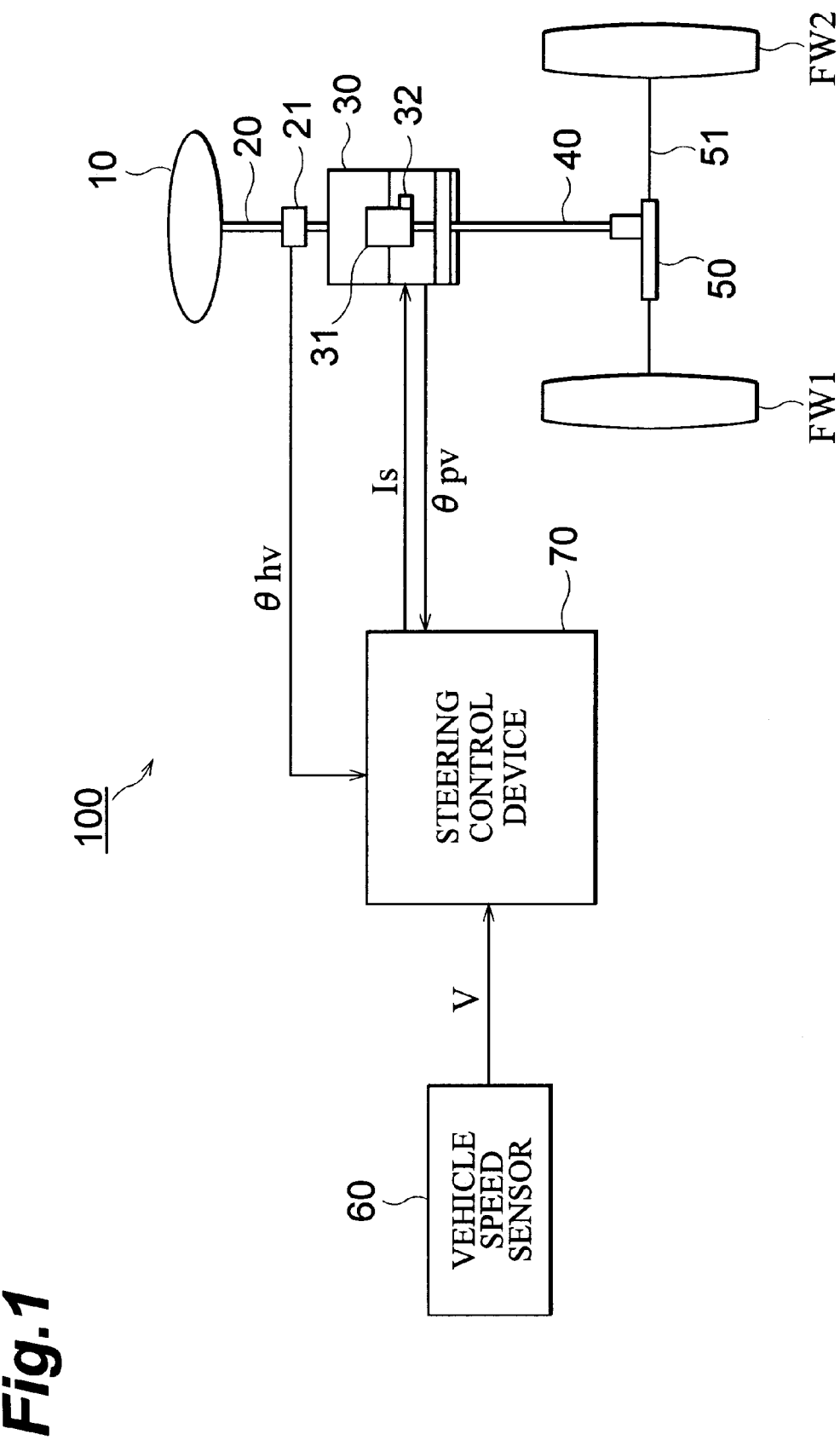
FIG. 1 is a block diagram to show the overall structure of the steering apparatus.

FIG. 1 shows the structure of steering apparatus 100 according to an embodiment.

An input shaft 20 is connected through a transmission ratio varying mechanism 30 to an output shaft 40 and a steering handle (steering wheel) 10 is connected to the input shaft 20. The output shaft 40 is connected to a rack shaft 51 through a gear system 50 of the rack-and-pinion type and wheels FW1, FW2 are connected to the both ends of the rack shaft 51. The input shaft 20 is provided with a steering speed sensor 21 for detecting the steering speed of the steering wheel 10.

The transmission ratio varying mechanism 30 connects the input shaft 20 to the output shaft 40 through a gear mechanism and is constructed so as to drive this gear mechanism by servo motor 31 as an actuator, thereby permitting change in the transmission ratio of rotations between the input shaft and the output shaft. This servo motor 31 is equipped with a rotational speed sensor 32 for detecting the rotational speed of the servo motor 31.

Steering control device 70 receives supply of detection results including the steering speed θhv detected by the steering speed sensor 21, the rotational speed θpv of the servo motor 31 detected by the rotational speed sensor 32, and the vehicle speed V detected by vehicle speed sensor 60, sets the transmission ratio based on these detection results, and controls the rotational speed of the servo motor 31 according to the transmission ratio thus set.

Figure 2:
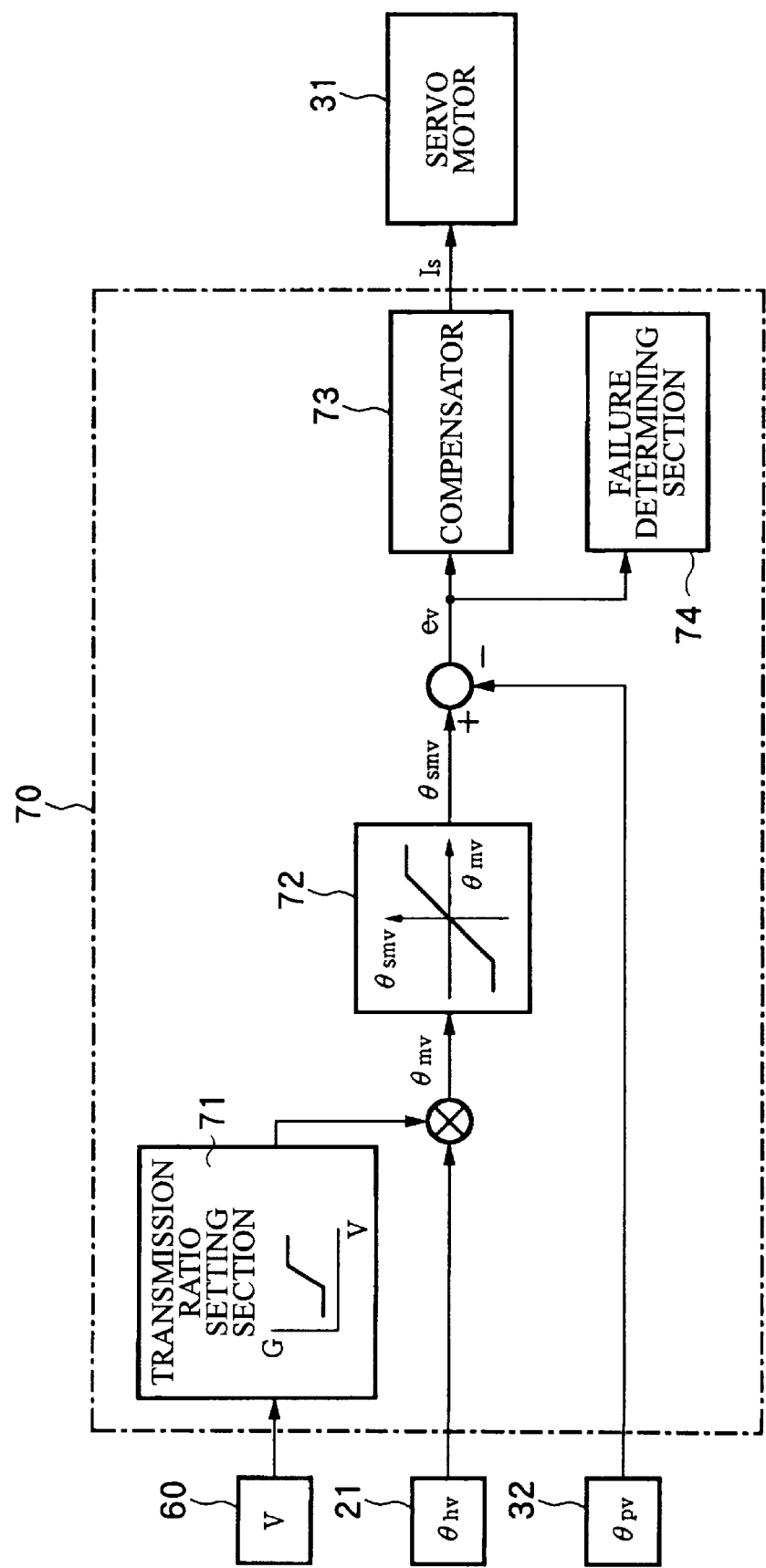
FIG. 2 is a block diagram to show the structure of the steering control device.

FIG. 2 shows the structure of the steering control device 70. The steering control device 70 is equipped with transmission ratio setting section 71, target speed limiting section 72, compensator 73, and failure determining section 74.

The transmission ratio setting section 71 searches a map indicating the relationship between vehicle speed V and transmission ratio G, based on the speed V detected by the speed sensor 60, to set the transmission ratio G (G=steering input amount/turned output amount) according to the speed V. Based on the transmission ratio G thus set and the steering speed θhv detected by the steering speed sensor 21, the target rotational speed θmv of the servo motor 31 is computed according to θmv=G.θhv and the result of this computation is supplied to the target speed limiting section 72.

Figure 3:
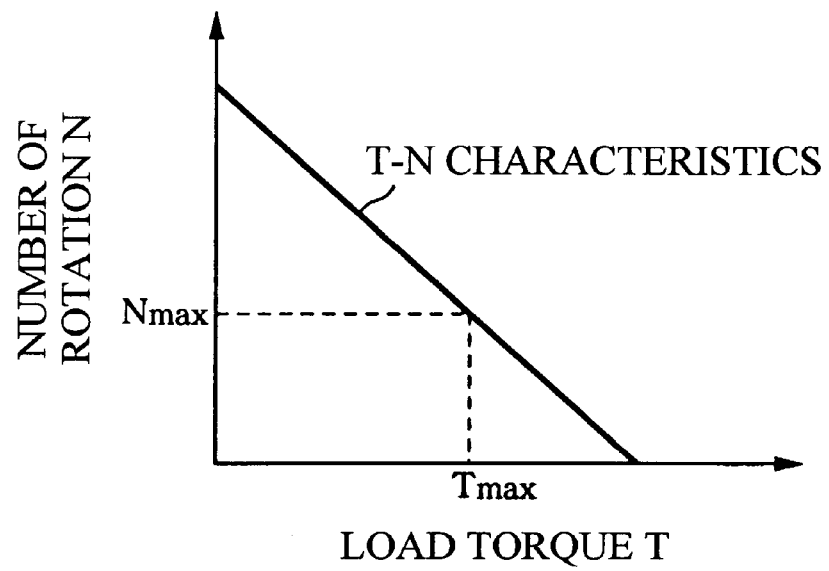
FIG. 3 is a characteristic diagram to show the relation between the load torque T and the number of rotation N in the servo motor.
Figure 4:
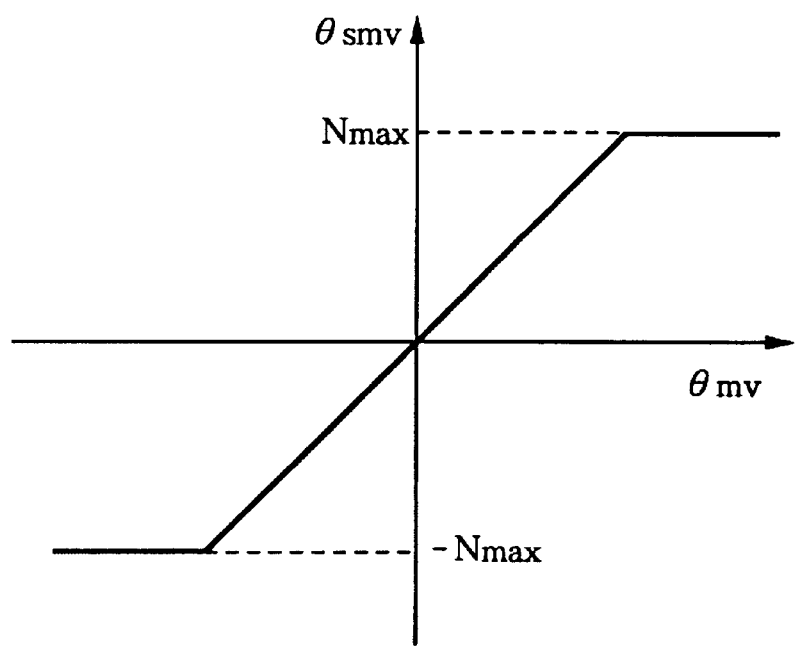
FIG. 4 is a graph to show the limiting process in the target speed limiting section.

The target speed limiting section 72 has a function as a limiter to limit the target rotational speed θmv of the servo motor 31 to below the maximum rotational speed which was preset. This maximum rotational speed is set based on the performance characteristics of the servo motor 31. For example, where the servo motor 31 has the load torque (T)-number of rotation (N) characteristics illustrated in FIG. 3, the maximum reaction (load torque) from road surfaces is preliminarily assumed to be Tmax, and then the maximum number of rotation (rotational speed) is obtained as Nmax from the graph of FIG. 3. The target speed limiting section 72 limits the target rotational speed θmv to within the range of ±Nmax as illustrated in FIG. 4 and outputs a value subject to the limitation, as θsmv.

Supplied to the compensator 73 is the deviation ev (ev=θsmv−θpv) between the target rotational speed θsmv outputted from the target speed limiting section 72 and the rotational speed θpv of the servo motor 31 detected by the rotational speed sensor 32. This compensator 73 computes Is=C(s).ev, using the transfer function C(s) obtained by properly setting parameters of PID control, to determine the control signal Is, which is supplied to the servo motor 31. In the function "s" stands for the Laplace operator.

Figure 5A:
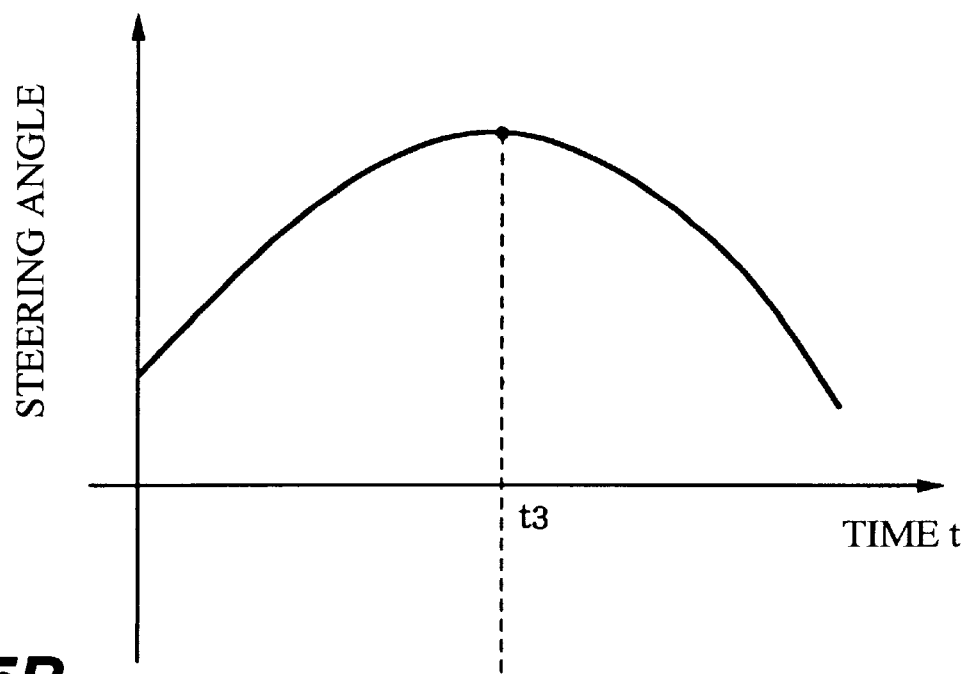
FIG. 5A is a graph to show the relationship between time and steering angle.
Figure 5B:
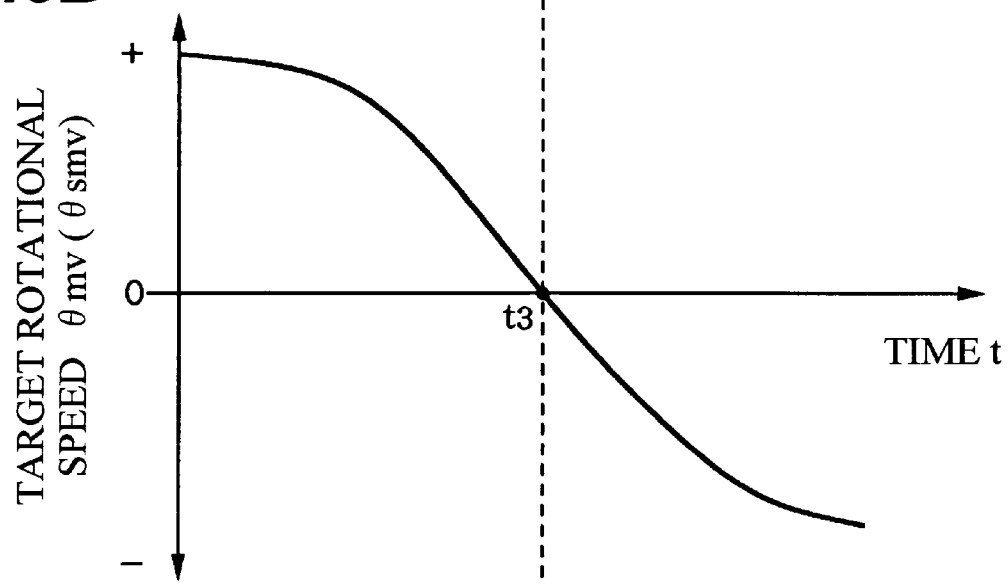
FIG. 5B is a graph to show the relationship between time and the target rotational speed.

In this way the steering control device 70 carries out the speed control of the servo motor 31 according to the steering speed θhv of the steering wheel 10, based on the transmission ratio set. For example, supposing that the abrupt switching-back operation to switch the steering wheel 10 back is conducted at the point of time t3 as illustrated in FIGS. 5A and 5B, this control gradually decreases the target rotational speed θmv of the servo motor 31 toward the time t3 and makes θmv=0 at the point of time t3. Therefore, the actual rotational speed of the servo motor 31 is controlled so as to gradually decrease toward the time t3 and to be nulled at the point of time t3. As a consequence, the influence of remaining deviation, which occurred upon execution of the positional control, can be eliminated by carrying out the control of the rotational speed of the servo motor 31 based on the steering speed, even in the cases of abrupt switching-back steering and stop of steering after the abrupt steering operation. This can adequately suppress occurrence of the overshoot due to the inertia of motor.

The value of deviation ev is also supplied to the failure determining section 74. The failure determining section 74 determines whether a failure occurs in this control system. Since the target rotational speed is limited by the target speed limiting section 72 as stated previously, the deviation ev between the target rotational speed θsmv and the rotational speed θpv of the servo motor 31 should take a value within a predetermined range. The failure determining section 74 thus compares the deviation ev with a predetermined threshold. When the value of the deviation ev is larger than the threshold, the failure determining section 74 determines that a failure occurs in this control system and informs the driver of the occurrence of failure by performing a process of turning an alarm lamp or the like on.

Another embodiment will be described below.

Figure 6:
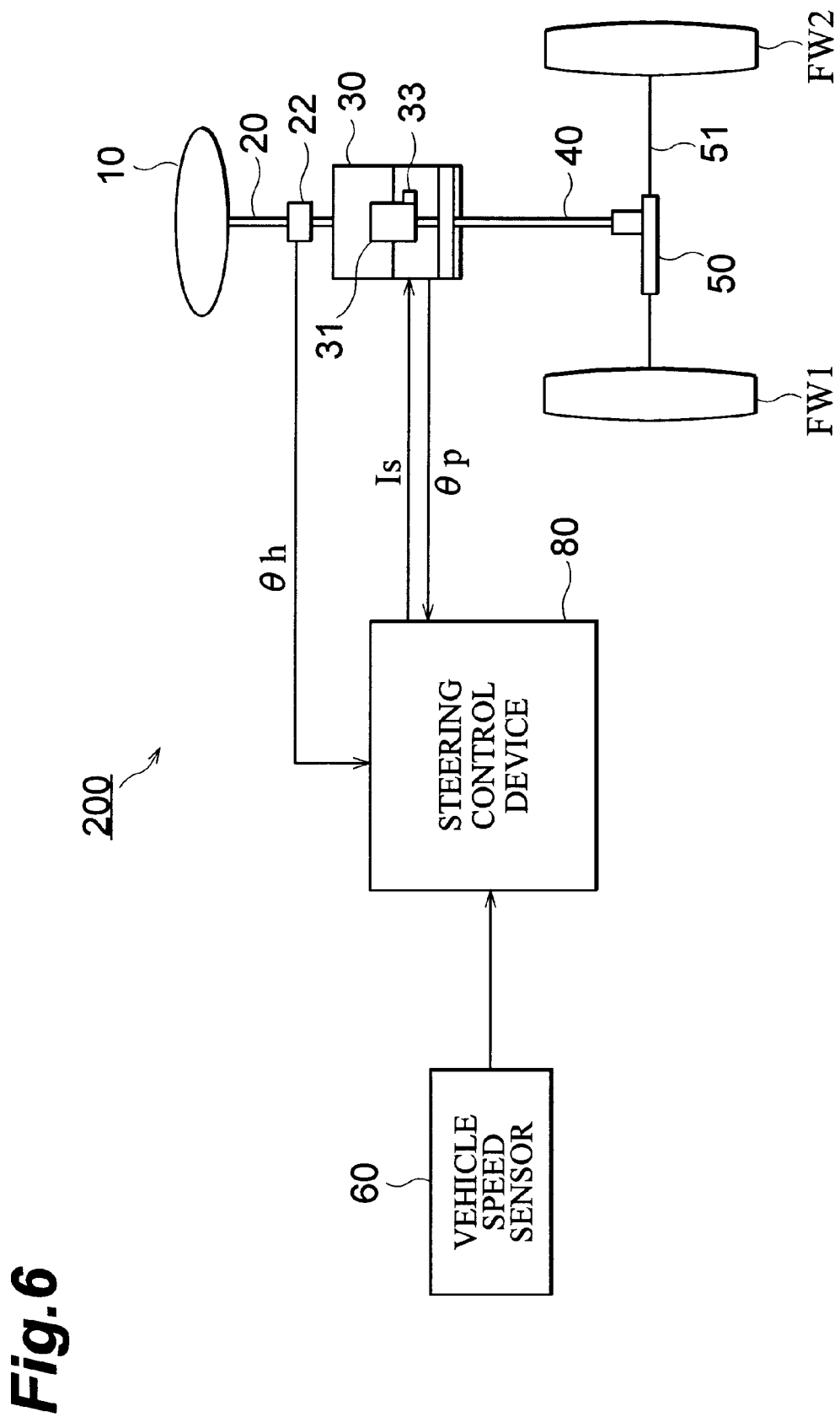
FIG. 6 is a block diagram to show the overall structure of the steering apparatus according to another embodiment.

FIG. 6 shows the structure of steering apparatus 200 according to another embodiment. The same components as those in FIG. 1 will be denoted by the same reference numerals and the description thereof will be omitted.

The input shaft 20 is equipped with a steering angle sensor 22 for detecting a steering angle of the steering wheel 10 and the servo motor 31 of the transmission ratio varying mechanism 30 is equipped with a rotational angle sensor 33 for detecting a rotational angle of the servo motor 31.

The steering control device 80 receives supply of detection signals from the steering angle sensor 22, from the rotational angle sensor 33, and from the vehicle speed sensor 60, sets the transmission ratio based on these detection signals, and executes the speed control of the servo motor 31 according to the transmission ratio thus set.

Figure 7:
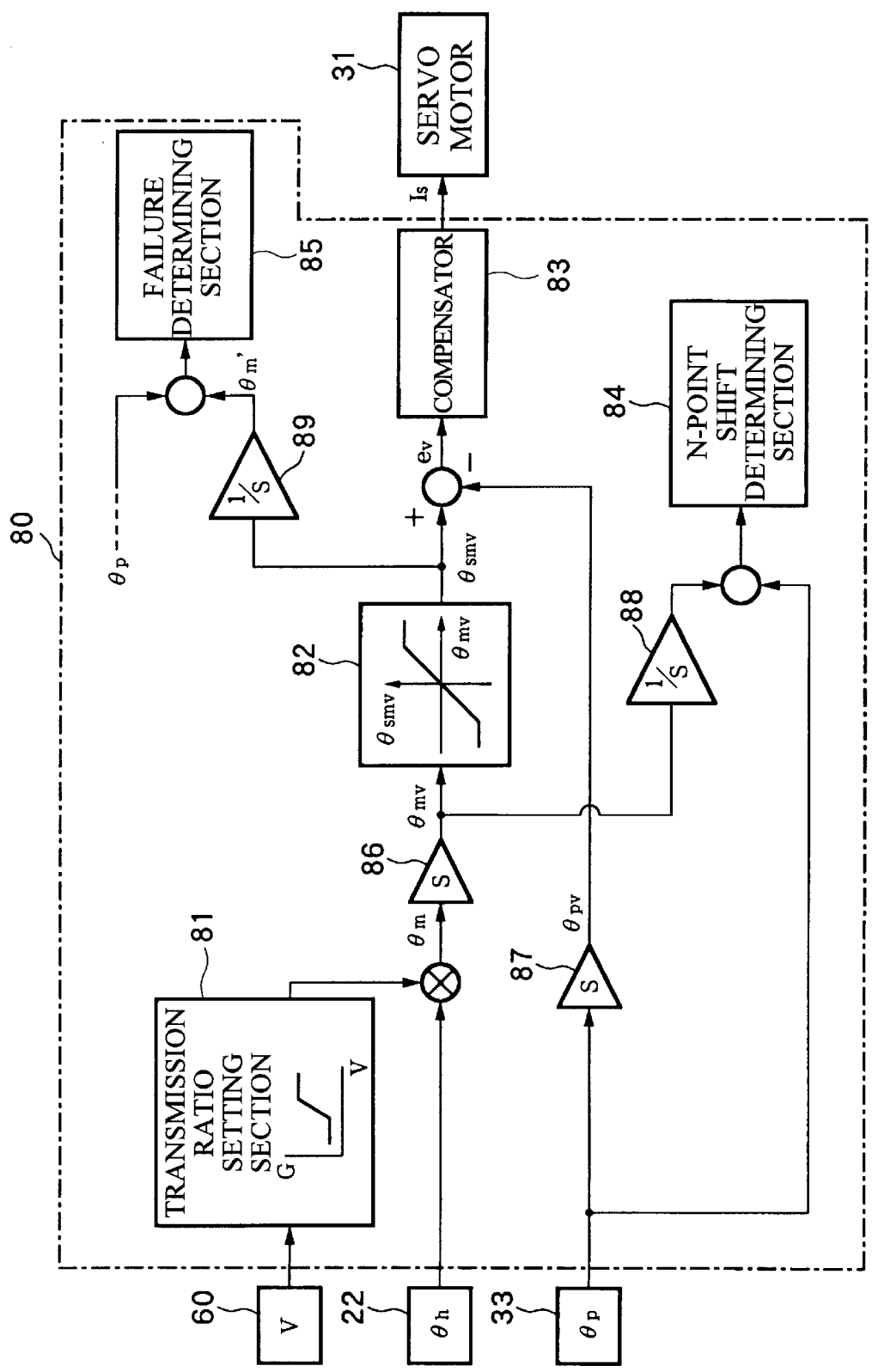
FIG. 7 is a block diagram to show the structure of the steering control device in FIG. 6.
Figure 8:
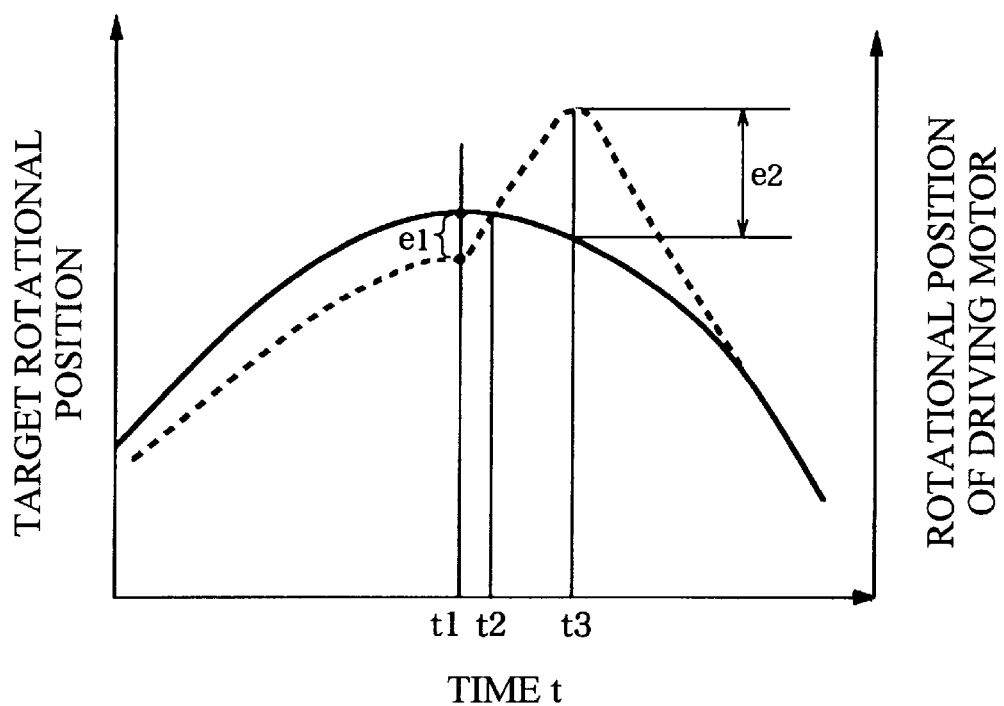
FIG. 8 is a graph to show the relation between target rotational position (solid line) and rotational position of the driving motor (dashed line) when control is exercised based on positional deviation.

FIG. 7 illustrates the structure of the steering control device 80. The steering control device 80 is provided with transmission ratio setting section 81, target speed limiting section 82, compensator 83, N-point shift determining section 84, failure determining section 85, differentiators 86, 87, and integrators 88, 89.

The transmission ratio setting section 81 performs the map search based on the vehicle speed V detected by the speed sensor 60 with reference to the map indicating the relationship between vehicle speed V and transmission ratio G to set the transmission ratio G according to the vehicle speed V. Based on the transmission ratio G thus set and the steering angle θh detected by the steering angle sensor 22, a value of target rotational angle θm indicating a target rotational position of the servo motor 31 is computed according to θm=G.θh. This computation result is supplied to the differentiator 86 to be converted to the target rotational speed θmv of the servo motor 31.

The target speed limiting section 82 functions as a limiter to limit the target rotational speed θmv to the range not more than the maximum rotational speed set based on the performance characteristics of the servo motor 31, similar to the target speed limiting section 72 described previously. The target rotational speed θmv outputted from the differentiator 86 is input to this target speed limiting section 82 to be limited to a value not more than the maximum rotational speed, and then the value is outputted as the target rotational speed θsmv.

On the other hand, the rotational angle θp of the servo motor 31 detected by the rotational angle sensor 33 is supplied to the differentiator 87 to be converted to the rotational speed θpv of the servo motor 31.

The compensator 83 is given the deviation ev (ev=θsmv−θpv) between the target rotational speed θsmv outputted from the target speed limiting section 82 and the rotational speed θpv of the servo motor 31 outputted from the differentiator 87 and computes Is=C(s).ev to determine the control signal Is, which is supplied to the servo motor 31.

The target rotational speed θmv outputted from the differentiator 86 is supplied to the integrator 88 to be converted to target rotational angle θm of the servo motor 31. This target rotational angle θm resulting from the conversion, and the actual rotational angle θp of the servo motor 31 detected by the rotational angle sensor 33 are input to the N-point shift determining section 84.

The N-point shift determining section 84 compares this target rotational angle θm with the value of rotational angle θp, for example, at the timing when the deviation ev becomes zero. When this comparison results in disagreement between the two values, the neutral point (N point) of the steering wheel 10 is different from that of the wheels FW1, FW2. If a difference between the two values falls outside a predetermined range, the apparatus executes, for example, a process of turning on an alarm lamp for indicating the N-point shift of the steering wheel 10 to notify the driver of the occurrence of N-point shift. There will be no trouble at all in steering of the vehicle, per se, even if a small shift occurs between the neutral position of the steering wheel 10 and the neutral position of the wheels FW1, FW2.

The target rotational speed θsmv outputted from the target speed limiting section 82 is also supplied to the integrator 89 to be converted to target rotational angle θm' of the servo motor 31. This target rotational angle θm' resulting from the conversion, and the actual rotational angle θp of the servo motor 31 detected by the rotational angle sensor 33 are supplied to the failure determining section 85.

The failure determining section 85 determines whether a failure occurs in this control system. Since the target rotational speed is limited by the target speed limiting section 82 described previously, the deviation between the target rotational angle θm' obtained through the integrator 89 after the limitation and the actual rotational angle θp of the servo motor 31 should take a value within a predetermined range. When this deviation is larger than a predetermined threshold, the failure determining section 85 determines that a failure occurs in this control system, and performs the process of switching the alarm lamp on or the like to inform the driver of the occurrence of failure. The failure of the control system is determined based on the angular position in this way.

In each embodiment described above the servo motor 31 was exemplified as an actuator for driving the transmission ratio varying mechanism 30, but the actuator can also be composed of another motor, such as a stepping motor. In this case, the target speed limiting section 72, 82 estimates the maximum reaction (load torque) from the road surfaces, determines the maximum of the number of rotation of the motor according to the estimated load torque, based on the load torque (T)-number of rotation (N) characteristics concerning the motor employed, and limits the rotational speed of the motor to the range not more than the maximum determined.

The embodiments illustrated the examples in which the vehicle speed V was detected as a running condition of the vehicle and the transmission ratio G was set according to the vehicle speed V, but, in another embodiment, the apparatus can also be constructed to detect the vehicle speed V and the input angle θh as running conditions of the vehicle and to set the transmission ratio G according to the vehicle speed V and input angle θh.

The embodiments illustrated the examples in which the target speed was limited by the target speed limiting section 72, but, in place of the target speed limiting section 72, the apparatus can also be constructed to provide the steering speed sensor 21 itself with such saturation characteristics that the output becomes saturated when the output of the steering speed sensor 21 exceeds a predetermined level.

As detailed above, the steering control apparatus for vehicle employs the structure in which the-driving speed setting means sets the target driving speed of the actuator according to the steering speed of the steering wheel and in which the speed control means controls the speed of the actuator so as to match it with the target driving speed thus set. This controls the driving speed of the actuator according to the steering speed of the steering wheel, which can adequately suppress the overshoot due to the inertia of the motor appearing on the occasion of abrupt switching-back steering or the like and in turn improve the steering feeling, as compared with the case where the driving control of the actuator is carried out based on the positional deviation as before.

As stated above, the steering control apparatus for a vehicle comprises: (A) a transmission ratio varying mechanism (30) capable of varying the amount of angular rotation of an output shaft (40) relative to the amount of angular rotation of an input shaft (20) connected to a steering handle (10); and (B) a steering control device (70) that controls the transmission ratio (G) by driving the mechanism (30), the device (70) driving the mechanism (30) so as to make the real driving speed (θpv) of the mechanism (30) a target driving speed (θmv), the target driving speed (θmv) being based on a predetermined transmission ratio (G) and actual rotational speed (θhv) of the steering handle (10).

This predetermined transmission ratio (G) is determined using data on the vehicle's operational condition.

The operational condition is defined based on signals from a vehicle velocity sensor (60).

The mechanism (30) includes an actuator (31) driven by the control device (70).

The actual rotational speed (θhv) is detected by an actual rotational speed sensor (21) for the steering handle (10).

The actual rotational speed (θhv) is detected by using angular data (θh) from a steering angle sensor (22) for the steering handle (10), the angular data (θh) being converted to the actual rotational speed (θhv) by calculating the differential of the angular data (θhv).

The target driving speed (θmv) is limited to less than a predetermined value (Nmax).

The defect diagnosis is performed by based on the real driving speed (θpv) and the target driving speed (θmv).

In more detail, the above apparatus is a steering control apparatus for vehicle adapted to change a transmission ratio between a steering amount and a turn amount by driving a transmission ratio varying mechanism by an actuator, the steering control apparatus for vehicle comprising: transmission ratio setting means for setting the transmission ratio according to a running condition of a vehicle; steering speed detecting means for detecting a steering speed of a steering wheel; driving speed setting means for setting a target driving speed for the actuator, based on the transmission ratio set by the transmission ratio setting means and the steering speed detected by the steering speed detecting means; and speed control means for controlling a speed of the actuator to the target driving speed set by the driving speed setting means.

Further, the steering control apparatus further comprises limiting means for limiting the target driving speed to the magnitude within a predetermined range.

Further, the steering control apparatus further comprises: driving speed detecting means for detecting the driving speed of the actuator; and failure determining means for determining whether a failure occurs, based on the driving speed detected by the driving speed detecting means and the target driving speed limited by the limiting means.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A steering control apparatus for a vehicle, comprising:
   (A) a transmission ratio varying mechanism capable of varying an amount of angular rotation of an output shaft relative to an amount of angular rotation of an input shaft connected to a steering handle, said transmission ratio varying mechanism connecting with and arranged between said input and output shafts, said transmission ratio varying mechanism including an actuator for varying the transmission ratio when said actuator is driven; and
   (B) a steering control device that controls the transmission ratio by driving said actuator of said transmission ratio varying mechanism, a real driving speed of said actuator of said transmission ratio varying mechanism being monitored, said steering control device driving said actuator of said transmission ratio varying mechanism so as to make a real driving speed of said transmission ratio varying mechanism a target driving speed, the target driving speed being based on a predetermined transmission ratio and actual rotational speed of said steering handle.

2. An apparatus according to claim 1, wherein said predetermined transmission ratio is determined using data on the vehicle's operational condition.

3. An apparatus according to claim 2, wherein said operational condition is defined based on signals from a vehicle velocity sensor.

4. An apparatus according to claim 1, wherein said actual rotational speed is detected by an actual rotational speed sensor for said steering handle.

5. An apparatus according to claim 1, wherein said actual rotational speed is detected by using angular data from a steering angle sensor for said steering handle, said angular data being converted to the actual rotational speed by calculating the differential of the angular data.

6. An apparatus according to claim 1, wherein said target driving speed is limited to less than a predetermined value.

7. An apparatus according to claim 6, wherein defect diagnosis is performed by based on the real driving speed and the target driving speed.

8. A steering control apparatus for a vehicle adapted to change a transmission ratio between a steering amount of an input shaft which is connected to a steering handle and a turn amount of an output shaft, said steering control apparatus having a transmission ratio varying mechanism which connects with and is arranged between said input and output shafts, said transmission ratio varying mechanism including an actuator for varying the transmission ratio when said actuator is driven, said steering control apparatus comprising:

transmission ratio setting means for setting said transmission ratio according to a running condition of a vehicle;
   steering speed detecting means for detecting the steering speed of said steering handle;
   driving speed setting means for setting a target driving speed for said actuator, based on the transmission ratio set by said transmission ratio setting means and the steering speed detected by said steering speed detecting means; and
   speed control means for controlling a speed of said the actuator to the target driving speed set by said driving speed setting means.

9. The steering control apparatus for vehicle according to claim 8, further comprising limiting means for limiting said target driving speed to the magnitude within a predetermined range.

10. The steering control apparatus for vehicle according to claim 9, further comprising:
    driving speed detecting means for detecting the driving speed of said actuator; and
    failure determining means for determining whether a failure occurs, based on the driving speed detected by said driving speed detecting means and the target driving speed limited by said limiting means.

* * * * *